United States Patent
Huang

(10) Patent No.: US 8,561,568 B2
(45) Date of Patent: Oct. 22, 2013

(54) APPARATUS FOR MANUFACTURING LIGHT GUIDE FILM

(75) Inventor: Yung-Lun Huang, Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 586 days.

(21) Appl. No.: 12/826,680

(22) Filed: Jun. 30, 2010

(65) Prior Publication Data
US 2011/0303144 A1 Dec. 15, 2011

(30) Foreign Application Priority Data
Jun. 9, 2010 (TW) .............................. 99118634 A

(51) Int. Cl.
*B05C 1/08* (2006.01)

(52) U.S. Cl.
USPC ............. 118/66; 118/641; 118/642; 118/643; 118/211; 118/212

(58) Field of Classification Search
USPC ............ 118/641–643, 66, 211, 212; 425/363, 425/366; 101/3.1; 362/606, 620
See application file for complete search history.

(56) References Cited

U.S. PATENT DOCUMENTS

| | | | |
|---|---|---|---|
| 6,495,214 B1 * | 12/2002 | Prix et al. | 427/510 |
| 7,444,932 B2 * | 11/2008 | Strand et al. | 101/23 |
| 2006/0086266 A1 * | 4/2006 | Spatafora | 101/3.1 |
| 2009/0220708 A1 * | 9/2009 | Schmitt | 428/29 |
| 2010/0085771 A1 | 4/2010 | Lin | |

FOREIGN PATENT DOCUMENTS

CN 101498859 A 8/2009

* cited by examiner

*Primary Examiner* — Laura Edwards
(74) *Attorney, Agent, or Firm* — Altis & Wispro Law Group, Inc.

(57) ABSTRACT

An exemplary apparatus for manufacturing a light guide film having patterns simultaneously formed on two opposite surfaces thereof, includes a first conveyor roller, a second conveyor roller, a imprinting group roller, two coating devices, two solidifying devices, a first template and a second template. The imprinting group rollers are positioned between the first and second conveyor rollers, including a first imprinting roller and a second imprinting roller opposite to the first imprinting roller. The two coating devices are positioned between the first conveyor roller and the imprinting group roller. The two solidifying devices are positioned between the imprinting group rollers and the second conveyor roller. The first template has a first imprinting pattern, and is fixed on a circumferential surface of the first imprinting roller. The second template has a second imprinting pattern, and is fixed on a circumferential surface of the second imprinting roller.

8 Claims, 2 Drawing Sheets

APPARATUS FOR MANUFACTURING LIGHT GUIDE FILM

BACKGROUND

1. Technical Field

The present disclosure relates to apparatus for manufacturing light guide films, and particularly, to an apparatus for manufacturing a light guide film having patterns formed on opposite surfaces thereof.

2. Description of Related Art

A conventional method for manufacturing a light guide film having patterns formed on two opposite surfaces thereof generally includes following steps: providing a film substrate; depositing a first template having a plurality of first imprinting patterns, for instance, through holes, on a first surface of the film substrate; filling the through holes with transparent solidifiable materials; solidifying the solidifiable materials and obtaining a plurality of first patterns, for instance, dots, in the through holes; removing the first template; pressing a second template having a plurality of second imprinting patterns, i.e., cavities, onto a second surface of the film substrate, the second surface is opposite to the first surface, thereby forming a plurality of second patterns, for example, protrusions, corresponding to the cavities in the film substrate; solidifying the protrusions and removing the second template.

However, the first patterns and second patterns are formed step by step, and it requires significant time to deposit and remove the templates, which decreases manufacturing efficiency. Therefore, an apparatus for manufacturing light guide films having patterns simultaneously formed on two opposite surfaces thereof is desired.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

An embodiment of the present apparatus for manufacturing light guide films will now be described in detail below and with reference to the drawings.

Figure 1:
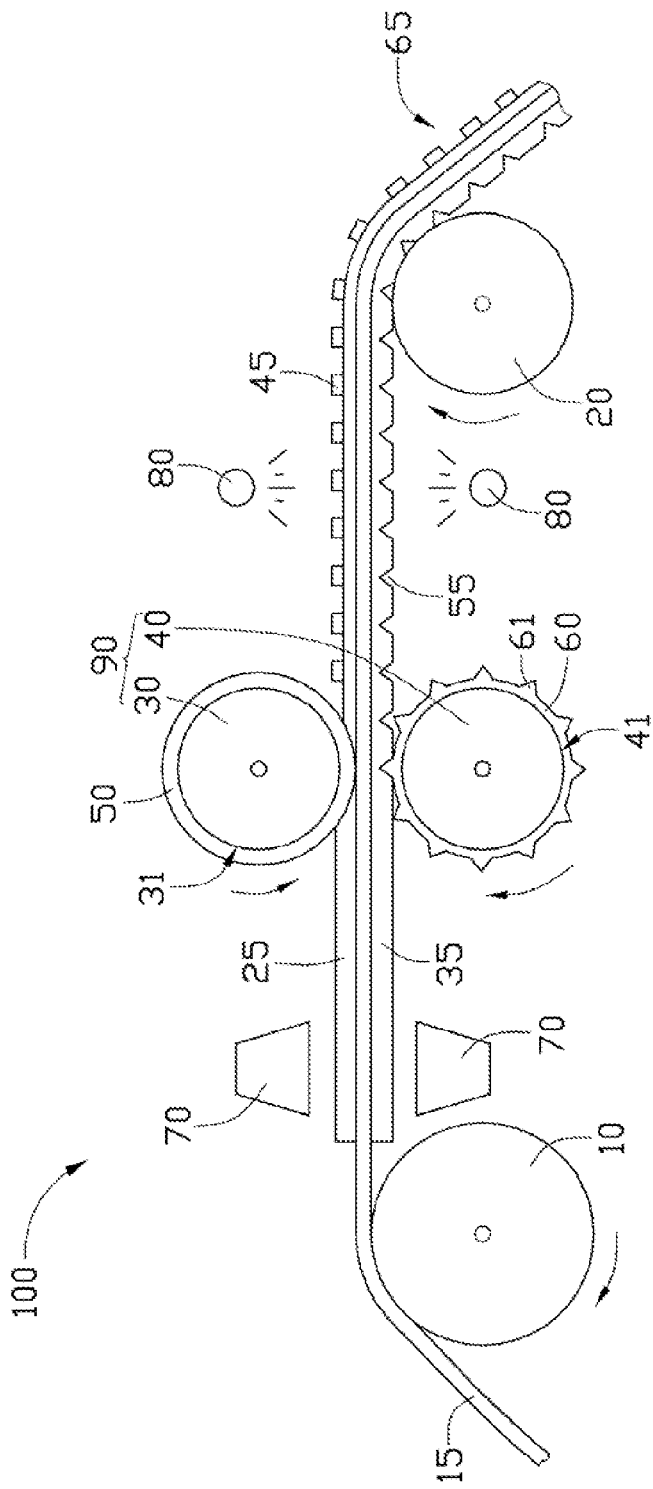
FIG. 1 is an isometric view of an exemplary apparatus for simultaneously forming patterns on opposite sides of a light guide film, the apparatus including a first template.

Referring to FIG. 1, in accordance with an exemplary embodiment, an apparatus 100 for manufacturing a light guide film includes a first conveyor roller 10, a second conveyor roller 20, an imprinting roller group 90, a first template 50, a second template 60, two coating devices 70 and two solidifying devices 80.

The first conveyor roller 10 and the second conveyor roller 20 are configured for cooperatively conveying a film substrate and a light guide film subsequently manufactured from the film substrate. The imprinting roller group 90 are positioned between the first conveyor roller 10 and the second conveyor roller 20. The imprinting roller group 90 includes a first imprinting roller 30 and a second imprinting roller 40 opposite to the first imprinting roller 30. The first imprinting roller 30 has a first circumferential surface 31, and the second imprinting roller 40 has a second circumferential surface 41.

Figure 2:
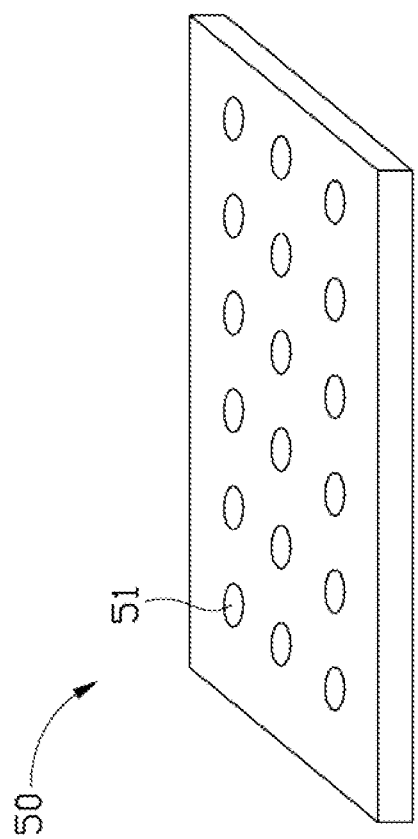
FIG. 2 is an isometric view of the first template of FIG. 1.

Referring to FIGS. 1 and 2, the first template 50 has a plurality of first patterns 51 arranged in arrays or patterns. In the present embodiment, the first patterns 51 are through holes. The first template 50 and the second template 60 are rolled up for respectively wrapping the entire first circumferential surface 31 and the entire second circumferential surface 41. The second template 60 has a plurality of second patterns 61. In the present embodiment, the second patterns 61 are spaced protrusions having V shaped cross-section. A distribution density of the first patterns 51 is substantially equal to a distribution density of the second patterns 61. In alternate embodiments, the second patterns 61 are continuously arranged protrusions. That means, each two neighboring protrusions directly connect with each other, and a cavity having V shaped cross-section is formed therebetween.

The two coating devices 70 are located between the first conveyor roller 10 and the imprinting roller group 90. The two coating devices 70 are aligned with each other. The two solidifying devices 80 are located between the imprinting roller group 90 and the second conveyor roller 20 in a manner that the two solidifying devices 80 are aligned with each other.

In a process for manufacturing a light guide film having patterns simultaneously formed on two opposite surfaces thereof, a film substrate 15 is initially provided. The film substrate 15 is made of transparent resin; for example, selected from the group consisting of polyethylene terephthalate (PET), polycarbonate (PC), and polymethyl methacrylate (PMMA). The film substrate 15 is conveyed from the first conveyor roller 10 to the second conveyor roller 20. Meanwhile, a first coating layer 25 and a second coating layer 35 are respectively and simultaneously coated onto two opposite surfaces of the film substrate 15 using the two coating devices 70. At the same time, the two coating devices 70 are arranged to move along a direction parallel to a direction of conveying the substrate, so as to smooth the first coating layer 25 and the second coating layer 35. The first and second coating layers 25, 35 can be made of transparent materials, for example, PMMA, silicon rubber, and epoxy resin. It is understood that the first coating layer 25 is pressed into a predetermined thickness by the first imprinting roller 30. When the first coating layer 25 arrives at the first imprinting roller 30, a plurality of first patterns 45, associated with the first patterns 51 of the first template 50, are formed. In the present embodiment, the first patterns 45 are cylindrical protrusions. It is also understood that a plurality of second patterns 55, associated with the second imprinting patterns 61, are simultaneously formed in the second coating layer 35. In the present embodiment, the second patterns 55 are cavities aligned with the first patterns 45. Subsequently, the film substrate 15 with the first and second patterns 45, 55 goes through a solidifying process by the solidifying devices 80 during a transmission from the group imprinting rollers 90 to the second conveyor roller 20. Thereafter, a light guide film 65 is obtained and laminated around the second conveyor roller 20 with the latter rotating around its central axis.

In the present embodiment, the first and second templates 50, 60 are respectively fixed on the first and second imprinting rollers 30, 40. Therefore, the first and second patterns 45, 55 can be simultaneously formed on the film substrate 15 when the first and second imprinting rollers 30, 40 press the film substrate 15. Hence, through this efficiency improvement, of a single process rather than a two process system, it greatly reduces manufacturing time and costs.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An apparatus for manufacturing a light guide film, the light guide film comprising a substrate, a first patterned layer formed on a first side of the substrate, and a second patterned layer formed on an opposing second side of the substrate, the apparatus comprising:
    a first conveyor roller;
    a second conveyor roller;
    a first imprinting roller;
    a second imprinting roller opposite to the first imprinting roller, the first and second imprinting rollers configured for being respectively arranged on the opposite sides of the substrate;
    a first coating device positioned on the first side of the substrate between the first conveyor roller and the first imprinting roller for forming a first layer on the first side of the substrate;
    a second coating device positioned on the second side of the substrate between the first conveyor roller and the second imprinting roller for forming a second layer on the second side of the substrate;
    a first solidifying device positioned between the first imprinting roller and the second conveyor roller;
    a second solidifying device positioned between the second imprinting roller and the second conveyor roller;
    a first template having a first imprinting pattern comprising an array of through holes, the first template fixed on a circumferential surface of the first imprinting roller for imprinting cylindrical protrusions in the first layer; and
    a second template having a second imprinting pattern comprising an array of protrusions, the second template fixed on a circumferential surface of the second imprinting roller, for simultaneously imprinting cavities aligned with the cylindrical protrusions in the first layer;
    wherein the first conveyor roller and second conveyor roller are positioned under the substrate in contact with the second side of the substrate such that the first conveyor roller is disposed prior to the second coating device while the second conveyor roller is positioned after the second solidifying device for cooperatively conveying the light guide film.

2. The apparatus of claim 1, wherein a distribution density of the through holes is substantially equal to a distribution density of the protrusions.

3. The apparatus of claim 1, wherein each of the protrusions has a V-shaped cross section.

4. The apparatus of claim 1, wherein the solidifying devices are selected from the group consisting of thermal solidifying devices, and a photosensitive solidifying device.

5. The apparatus of claim 1, wherein the second conveyor roller is configured to rotate around a central axis of the second conveyer roller to obtain the light guide film.

6. The apparatus of claim 1, wherein the first and second coating devices are structured and arranged to simultaneously coat the first coating layer and the second coating layer on two opposite surfaces of the substrate, the two opposite surfaces being at the first and second sides of the substrate, respectively.

7. The apparatus of claim 1, wherein the first and second conveyor rollers and the first and second coating devices are cooperatively structured and arranged for the first and second coating devices to coat the first coating layer and the second coating layer on two opposite surfaces of the substrate while the first and second conveyor rollers convey the substrate along a path between the first and second coating devices, the two opposite surfaces being at the first and second sides of the substrate, respectively.

8. The apparatus of claim 1, wherein the first and second coating devices are structured and arranged to move parallel to a conveying direction of the substrate to smooth the first coating layer and the second coating layer.

\* \* \* \* \*